United States Patent
Harres

(10) Patent No.: US 11,434,090 B2
(45) Date of Patent: Sep. 6, 2022

(54) SYSTEM AND EQUIPMENT FOR AUTOMATIC UNLOADING OF PARCELS

(71) Applicant: Siemens Logistics LLC, DFW Airport, TX (US)

(72) Inventor: Luiz Carlos Harres, Allen, TX (US)

(73) Assignee: Siemens Logistics LLC, DFW Airport, TX (US)

( * ) Notice: Subject to any disclaimer, the term of this patent is extended or adjusted under 35 U.S.C. 154(b) by 0 days.

(21) Appl. No.: 17/274,343

(22) PCT Filed: Nov. 6, 2018

(86) PCT No.: PCT/US2018/059412
§ 371 (c)(1),
(2) Date: Mar. 8, 2021

(87) PCT Pub. No.: WO2020/096577
PCT Pub. Date: May 14, 2020

(65) Prior Publication Data
US 2021/0347588 A1 Nov. 11, 2021

(51) Int. Cl.
*B65G 67/08* (2006.01)
*B65G 65/02* (2006.01)
*B65G 67/24* (2006.01)

(52) U.S. Cl.
CPC ............. *B65G 67/24* (2013.01); *B65G 65/02* (2013.01)

(58) Field of Classification Search
CPC ......... B65G 65/02; B65G 67/08; B65G 67/24
USPC ................... 198/308.1, 836.2; 414/389, 393
See application file for complete search history.

(56) References Cited

U.S. PATENT DOCUMENTS

| 4,522,556 | A | 6/1985 | Shapiro |
| 6,328,522 | B1 * | 12/2001 | Martz ...................... B65F 9/00 414/397 |
| 6,655,893 | B2 * | 12/2003 | Kelly .................... B65G 67/20 198/370.1 |

(Continued)

FOREIGN PATENT DOCUMENTS

| GB | 2093427 A | 2/1981 |
| WO | 2011133831 A1 | 10/2011 |

OTHER PUBLICATIONS

PCT International Search Report and Written Opinion of International Searching Authority dated Jul. 16, 2019 corresponding to PCT International Application No. PCT/US2018/059412 filed Nov. 6, 2018.

*Primary Examiner* — Douglas A Hess

(57) ABSTRACT

A system for automatic unloading of parcels from a container or trailer includes a base belt (310), a plurality of inserts (320, 322, 420, 422, 520, 522) and an automated unloading apparatus (200) with a ramp (230) and a conveyor (226). The ramp (230) is configured to pass under the base belt (310) and the conveyor (226) is configured to remove a plurality of items (370) when the automated unloading apparatus (200) moves into an interior of the container or trailer (350), and the base belt (310) is configured to be installed in a first section (360) of a floor (356) of the container or trailer (350), and the plurality of inserts (320, 322, 420, 422, 520, 522) is configured to be installed in a second section (362, 364) of the floor (356) of the container or trailer (350), such that the plurality of items (370) is either located on the base belt (310) or on the plurality of inserts (320, 322, 420, 422, 520, 522).

12 Claims, 5 Drawing Sheets

(56) References Cited

U.S. PATENT DOCUMENTS

| | | | | |
|---|---|---|---|---|
| 7,673,741 | B2* | 3/2010 | Nemedi | B65G 15/42 |
| | | | | 198/836.2 |
| 8,454,095 | B1* | 6/2013 | Dilts | B60P 1/003 |
| | | | | 298/1 B |
| 8,651,794 | B2* | 2/2014 | Pippin | B65G 67/24 |
| | | | | 414/797.6 |
| 9,650,215 | B2* | 5/2017 | Girtman | B65G 67/24 |
| 9,738,466 | B2* | 8/2017 | Pippin | B65G 67/24 |
| 10,035,657 | B2* | 7/2018 | Hartmann | B65G 21/14 |
| 10,537,918 | B2* | 1/2020 | Kringstad | B07B 13/16 |
| 10,836,591 | B2* | 11/2020 | Enenkel | B65D 25/22 |
| 11,161,704 | B2* | 11/2021 | Carpenter | G05B 6/02 |
| 2016/0280477 | A1 | 9/2016 | Pippin | |
| 2020/0299077 | A1* | 9/2020 | Harres et al. | |

* cited by examiner

SYSTEM AND EQUIPMENT FOR AUTOMATIC UNLOADING OF PARCELS

BACKGROUND

1. Field

Aspects of the present disclosure generally relate to the technical field of mail and parcel processing techniques.

2. Description of the Related Art

Automatic unloading of parcels from a container or trailer may be accomplished using an automated unloading apparatus. A known automatic unloading apparatus for use with a container or trailer includes for example a ramp and a conveyor. Multiple parcels are located on a base belt within the container or trailer, wherein the unloading apparatus is configured to move into an interior of the container or trailer for removing the multiple parcels. Such an apparatus may include expensive and sometimes unreliable mechanisms to unload parcels that are stacked in lower side corners of the container or trailer. Thus, improved and more efficient systems for unloading items from a container or trailer are desirable.

SUMMARY

A first aspect of the present disclosure provides a system for automatic unloading of parcels from a container or trailer comprising a base belt configured to be installed in a container or trailer and to carry a plurality of items, a plurality of inserts configured to be attached to interior walls of the container or trailer, and an automated unloading apparatus comprising a ramp and a conveyor and configured to move into an interior of the container or trailer, wherein the ramp is configured to pass under the base belt and the conveyor is configured to remove the plurality of items when the automated unloading apparatus moves into the interior of the container or trailer, and wherein the base belt is configured to be installed in a first section of a floor of the container or trailer, and the plurality of inserts are configured to be installed in a second section of the floor of the container or trailer, such that the plurality of items is either located on the base belt or on the plurality of inserts.

A second aspect of the present disclosure provides a belt kit for use with a system for automatic unloading of parcels from a container or trailer comprising a base belt configured to be installed in a container or trailer and to carry a plurality of items, and a plurality of inserts configured to be attached to interior walls of the container or trailer, wherein the base belt is configured to be installed in a first section of a floor of the container or trailer, and the plurality of inserts are configured to be installed in a second section of floor of the container or trailer, such that the plurality of items is either located on the base belt or on the plurality of inserts.

DETAILED DESCRIPTION

To facilitate an understanding of embodiments, principles, and features of the present disclosure, they are explained hereinafter with reference to implementation in illustrative embodiments. In particular, they are described in the context of being a system and belt kit for automatic unloading of parcels from a container or trailer. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Various disclosed embodiments include unloading items, such as for example parcels or packages, from a trailer or other container generally without operator intervention. An automated unloading apparatus is provided, wherein a nose ramp of the automated unloading apparatus is moved under a base belt in the trailer and under a first item of a plurality of items in the trailer. As the ramp continues advancing, the item is moved onto a conveyor, which is adapted to carry the item out of the trailer. In embodiments, a stack control curtain maintains the remaining items in a stack or pile during and after removal of the first item, and/or a tensioning mechanism maintains a desired tension on the base belt as the ramp moves under the base belt and the first item.

Figure 1:
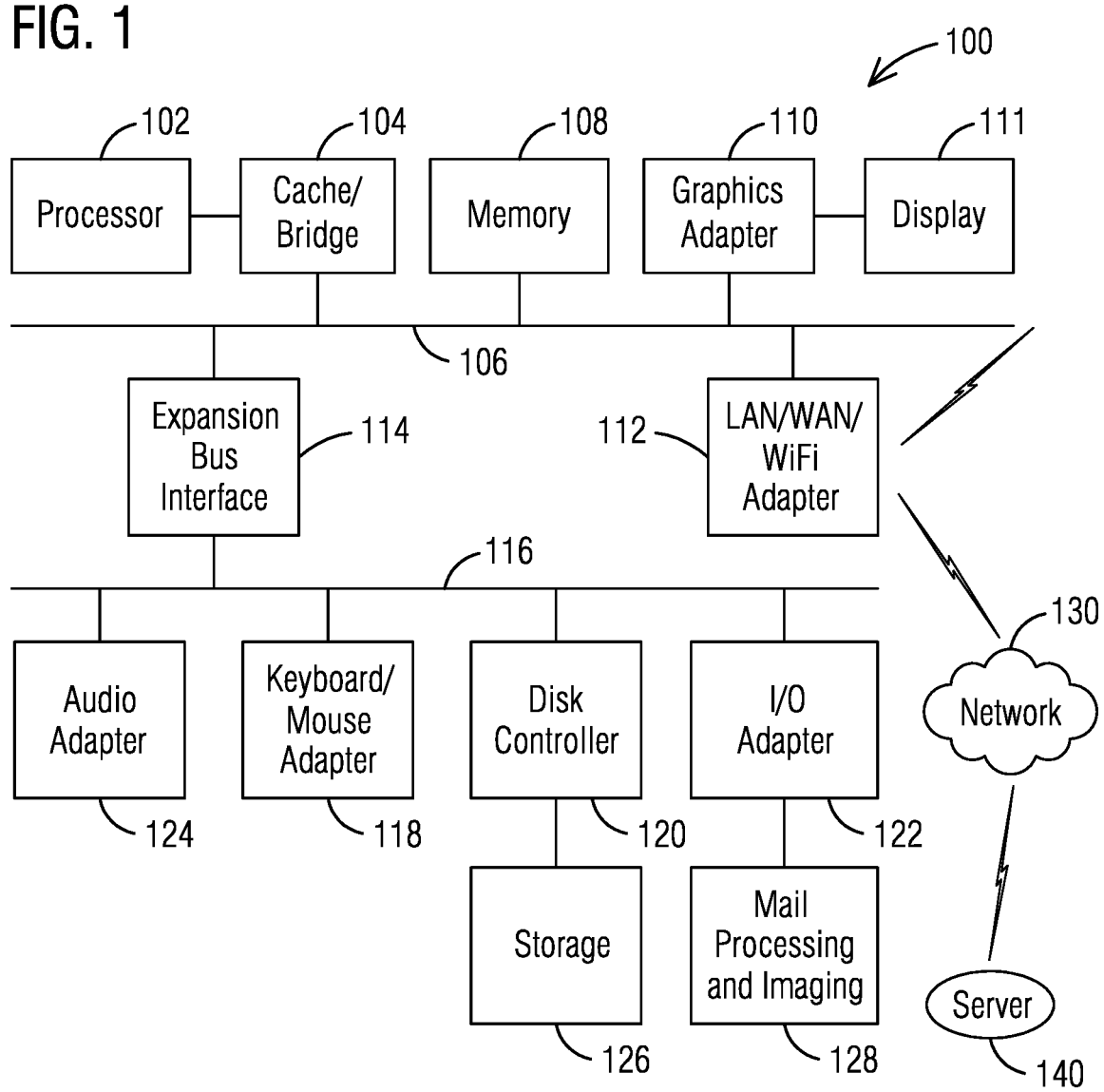
FIG. 1 depicts a block diagram of a data processing system in which an embodiment can be implemented.

FIG. 1 depicts a block diagram of a data processing system 100 in which an embodiment can be implemented, for example as a control system for a mechanism as described below and can be configured to perform processes as described herein.

The data processing system 100 depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/wide area network (WAN)/Wireless (e.g., Wi-Fi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to non-volatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 122 can be connected to mail processing and imaging devices 128, as described herein, to image, scan, transport, label, address process, sort, and otherwise processes the mail pieces in accordance with the various embodiments described herein. Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, track-pointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system 100 in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response. One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. LAN/WAN/Wireless adapter 112 can also communicate with packages as described herein and perform other data processing system or server processes described herein. Data processing system 100 can communicate over network 130 with one or more server systems 140, which are also not part of data processing system 100, but can be implemented, for example, as separate data processing systems 100. A server system 140 can be, for example, a central server system at a central mail processing facility.

Figure 2:
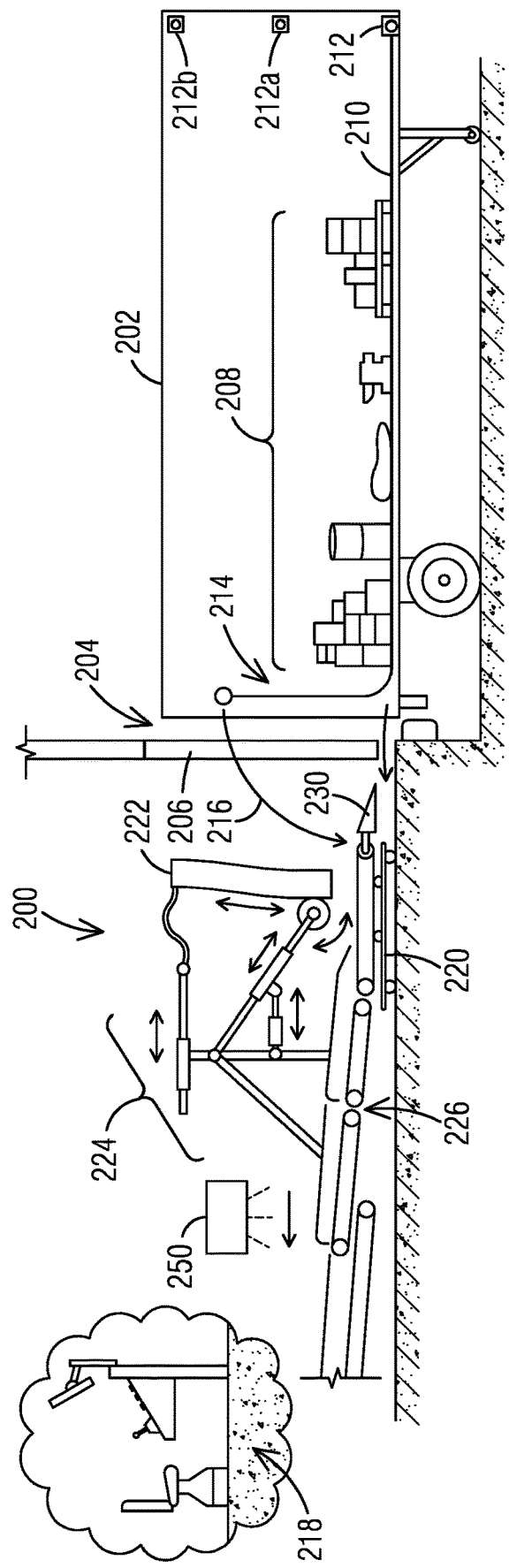
FIG. 2 depicts a schematic view of an automated unloading apparatus in accordance with an exemplary embodiment of the present disclosure.

FIG. 2 depicts a schematic view of an automatic unloader 200 in accordance with an exemplary embodiment of the present disclosure. A trailer 202 is positioned adjacent to a loading dock 204 and a dock door area 206 for unloading. In the trailer 202 are loaded items 208, which are to be unloaded by the automatic unloader 200.

The items 208 are positioned on top of a base belt 210, a first end of which is attached to the trailer at an attachment point 212. A second end of the base belt 210 (opposite to the first end) may be raised to a first transit position 214 to provide supported to stacked items during transit to help prevent stack collapse. The second end of the base belt 210 may alternately be placed in a second transit position (not shown in FIG. 2) on the floor of the trailer 202, where the base belt 210 may be rolled or gathered during transit. From either the first or second transit position, to initiate unloading of the trailer 202, the second end of the base belt 210 is brought generally along the path indicated by the arrow 216 to be attached to the automatic unloader 200, as described in greater detail below.

The unloader 200 is positioned at the open door of the trailer 202 by an operator at an operator console 218. The operator may use for example a video camera (not shown in FIG. 2) that is mounted to the unloader 200 or to the loading dock 204 and presents the operator with a view of the unloader 200 and the trailer 202.

The unloader includes a positioning mechanism 220, which is remotely operated by the operator to position the unloader 200 at the entrance to the trailer 202. The positioning mechanism 220 may be a motorized caster or other mechanism suitable for positioning the unloader 200 relative to the trailer 202 prior to initiating an unloading process or during the unloading process. The positioning mechanism 220 is operable to position the unloader 200 at least along a longitudinal axis of the trailer 202 or horizontally relative to the trailer 202. In some embodiments, the unloader 200 is substantially the same width as the interior of the trailer 202, such that the unloader 200 substantially fills the trailer 202 from one sidewall to the other sidewall.

The unloader 200 moves into the trailer along the trailer floor, sliding nose ramp 230 under the base belt 210 and under a rearmost item of the items 208. By sliding the nose ramp 230 under an item while the item remains on the base belt 210, the unloader 200 reduces the possibility of the nose ramp 230 pushing the item into the trailer, rather than sliding it up onto conveyor 226. When moving forward, the unloader 200 moves at a speed that substantially matches a speed of a transport belt of the conveyor 226. In this way, the items 208 are transferred with substantially no relative motion from the base belt 210 to the conveyor 226. Once on the conveyor 226, a lowest, rearmost item of the items 208 is carried under the stack curtain 222 out of the trailer 202 along the conveyor 226, onto possible further conveyor(s).

The unloader 200 may also include a stack control curtain 222 mounted to a positioning mechanism 224. The unloader 200 is coupled to an extendible conveyor 226, which is operable to carry items unloaded by the unloader 200 from the trailer 202. A sensor 250 may be mounted in a position that enables the sensor 250 to sense items on the unloader 200 or the extendible conveyor 226. The sensor 250 is operable to sense a label, RFID tag, barcode, or other identifying feature of such items.

Further embodiments of automated unloader apparatus are described in U.S. Pat. No. 8,651,794 B2 to Pippin and U.S. Pat. No. 9,738,466 B2 to Pippin which are incorporated by reference herein in their entirety.

Figure 3:
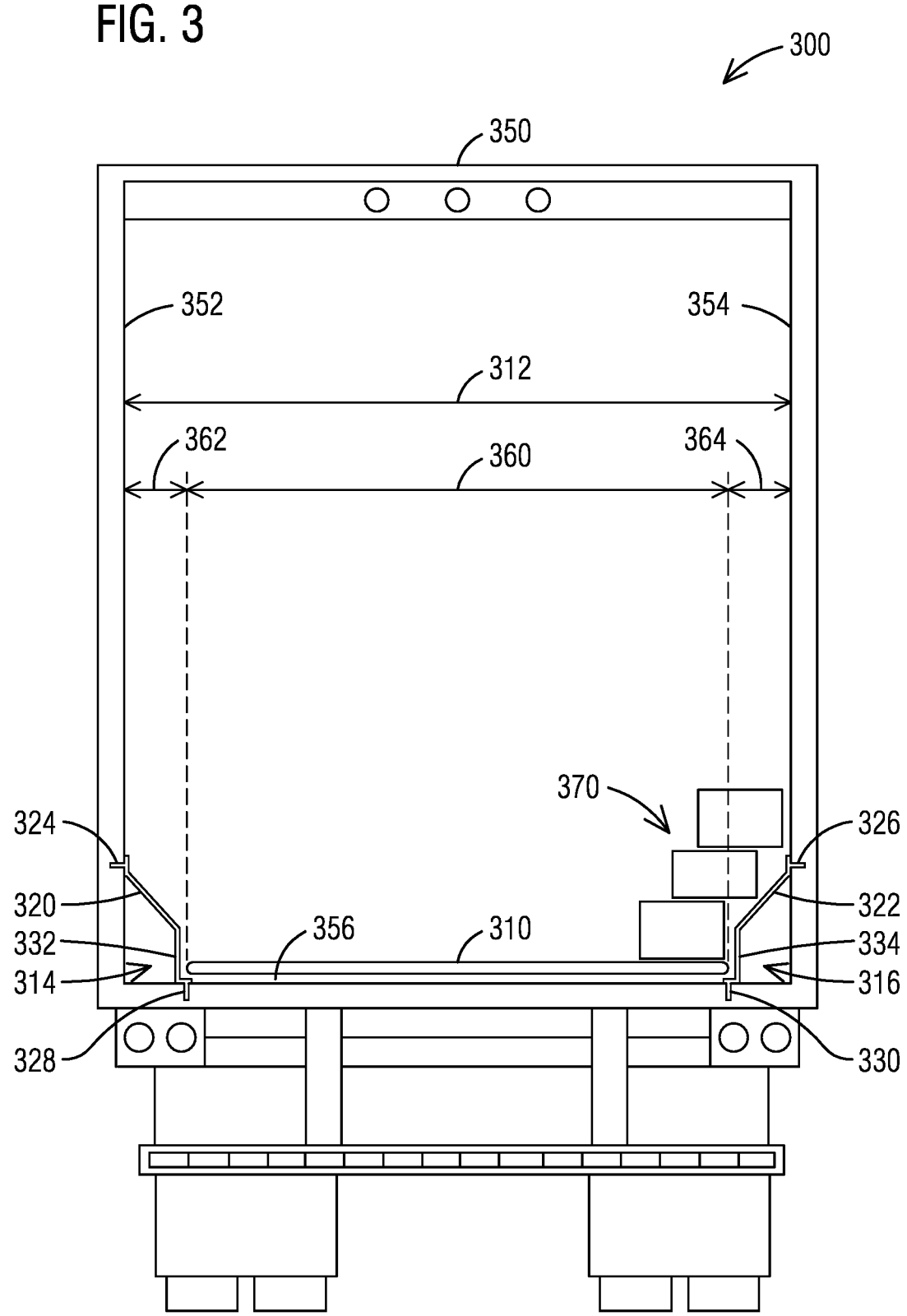
FIG. 3 depicts a portion of a system for automatic unloading of parcels in accordance with an exemplary embodiment of the present disclosure.

FIG. 3 depicts a portion of a system for automatic unloading of parcels in accordance with an exemplary embodiment of the present disclosure. The system for automatic unloading parcels is herein also referred to as automatic unloader system. The automatic unloader system comprises an automatic unloader apparatus, such as for example unloader 220 of FIG. 2, and accompanying equipment, e.g., a belt kit, as described herein.

The example of FIG. 3 shows a side view of a portion of an automatic unloader system, specifically a belt kit 300, installed within a trailer 350. Belt kit 300 comprises base belt 310 and a plurality of inserts 320, 322. The belt kit 300 is supplied or provided as equipment to be used in connection with unloading apparatus 200. The belt kit 300 may be provided together with the unloading apparatus 200 by the same provider or the belt kit 300 may be provided by a third party (without providing the unloading apparatus 200).

The walls of the trailer 350, or a container, are illustrated by thick lines, including portions around the doorway or other opening, which could include door-roller tracks, hinges, or other hardware. Although the figures are not to scale, those of skill in the art will recognize that the doorway of such a trailer or container is typically narrower than the entire width of the container 350.

As FIG. 3 shows, the belt kit is configured to be installed within trailer 350 or container. The base belt 310 is arranged along a trailer floor of the trailer 350. The base belt 310 is removably fastened at an interior location along a back wall of the trailer 350. The base belt 310 is substantially the same width as ramp 230 of unloader 200 (see FIG. 2), which is narrower than the entire width of the trailer 350, represented by arrow 312, so it can fit through a doorway of the trailer 350.

Since the base belt 310 is narrower than the width 312 of the trailer 350, loaded items, such as items 370, in the trailer 350 may fall off the base belt 310 on the floor 356 of the trailer 350. Specifically, loaded items may fall into lower side corners 314, 316 of trailer 350. The automatic unloader system, specifically the belt kit 300, prevents that items fall and are stacked in the lower side corners 314, 316.

In accordance with an exemplary embodiment of the present disclosure, the base belt 310 is installed in a first section 360 of a floor 356 of the trailer 350, and the plurality of inserts 320, 322 are installed in a second section 362, 364 of the floor 356 of the trailer 350. Thus, the plurality of items 370 is either located on the base belt 310 or on the plurality of inserts 320, 322. In this way, the inserts 320, 322 ensure that all of the loaded items 370 in the trailer 350 are properly unloaded by automatic unloader 200, and none are missed because they fell off the sides of base belt 310.

The plurality of inserts 320, 322 are configured to be attached to interior walls 352, 354 of trailer 350. The inserts 320, 322 may be attached to interior side walls 352, 354 and/or the floor 356 of the trailer 350.

The plurality of inserts 320, 322 comprises a first insert 320 configured to be attached to a first interior sidewall 352 and a second insert 322 configured to be attached to a second interior sidewall 354 opposite the first interior sidewall 352 of the container or trailer 350. The first and second inserts 320, 322 are configured to run an entire length of the first and second interior sidewalls 352, 354. The length of the first and second interior sidewalls 352, 354 runs perpendicular to the width 312 of the container and goes into drawing plane of FIG. 3.

In an exemplary embodiment of the present disclosure, the first and second inserts 320, 322 comprise rail elements with a predefined profile. The rail elements comprise sheet metal and/or plastic material. The rail elements are formed or shaped such that they provide or form a funnel when installed in the trailer 350. This way, the rail elements may cause some of the items 370, such as for example parcels or packages, to fall onto the base belt 310 and/or the conveyor 226 of the unloading apparatus 220 during an unloading process. The rail elements can be attached to the first and second interior sidewalls 352, 354 by screws or bolts 324, 326. The rail elements may be additionally secured to the floor 356 by screws or bolts 328, 330.

In another exemplary embodiment of the present disclosure, the inserts 320, 322, are formed such that they provide surfaces 332, 334 for guiding the automatic unloading apparatus 200 when entering the trailer 350. The surfaces 332, 334 are vertically arranged on the floor 356, i.e. they are perpendicular to the floor 356. In an example, the unloading apparatus 200 may comprise guide wheels mounted on either side of the ramp 230, wherein the guide wheels can run along the vertical surfaces 332, 334. This way, the unloading apparatus 200 is centred and there is no need for a further steering mechanism of the apparatus 200.

In another exemplary embodiment, the inserts 320, 322 can provide a sheltered tunnel because the inserts 320, 322 are formed such that they cover the lower corners 314, 316, but do not fill out the corners 314, 316. These tunnels may be used for alignment, such as for example laser alignment, of the unloading apparatus 200 when the unloading apparatus is about to enter the trailer 350.

Figure 4:
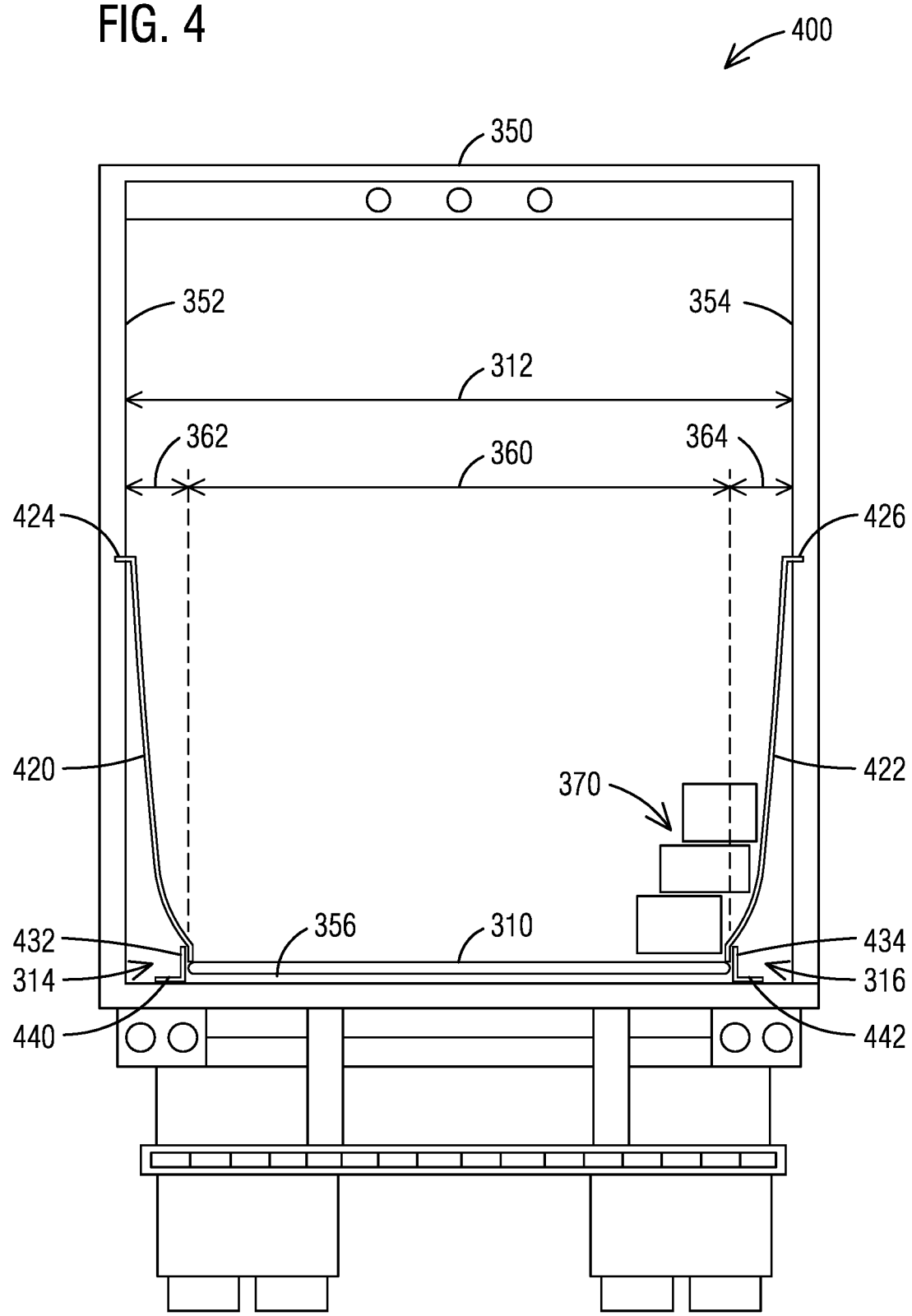
FIG. 4 depicts a portion of a system for automatic unloading of parcels in accordance with a further exemplary embodiment of the present disclosure.

FIG. 4 depicts a portion of a system for automatic unloading of parcels in accordance with an exemplary embodiment of the present disclosure. The embodiment shown in FIG. 4 provides another option for a belt kit, specifically belt kit 400, to be used in combination with unloading apparatus 200.

Belt kit 400, like the belt kit 300, comprises a first insert 420 configured to be attached to a first interior sidewall 352 and a second insert 422 configured to be attached to a second interior sidewall 354 opposite the first interior sidewall 352 of the container or trailer 350. The first and second inserts 420, 422 are configured to run an entire length of the first and second interior sidewalls 352, 354. The length of the first and second interior sidewalls 352, 354 runs perpendicular to the width 312 of the container or trailer 350 and goes into drawing plane of FIG. 4.

In accordance with the embodiment of FIG. 4, the belt kit 400 comprises base belt 310, wherein the inserts 420, 422 comprise drapes. The drapes comprise fabric and/or plastic material. The drapes are configured to be attached to the first and second interior sidewalls 352, 354 by screws or staples 424, 426.

The drapes are also formed or shaped such that they provide or form a funnel when installed in the trailer 350. This way, the drapes may cause some of the items 370 to fall onto the base belt 310 and/or the conveyor 226 of the unloading apparatus 220 during an unloading process.

In addition to the drapes, the inserts 420, 422 comprise L-shaped profiles 440, 442 secured to the floor 356. The drapes may be attached to the L-shaped profiles 440, 442 so that the drapes remain in place and can form the funnel. Further, the L-shaped profiles 440, 442 provide surfaces 432, 434 for guiding the automatic unloading apparatus 200 when entering the trailer 350. The surfaces 432, 434 are vertically arranged on the floor 356, i.e. they are perpendicular to the floor 356. In an example, the unloading apparatus 200 may comprise guide wheels mounted on either side of the ramp 230, wherein the guide wheels can run along the vertical surfaces 432, 434. This way, the unloading apparatus 200 is centred and there is no need for a further steering mechanism of the apparatus 200.

As described before, the inserts 420, 422 can also provide a sheltered tunnel because they are formed such that they cover the lower corners 314, 316, but do not fill out the corners 314, 316. These tunnels may be used for alignment, such as for example laser alignment, of the unloading apparatus 200 when the unloading apparatus is about to enter the trailer 350.

Figure 5:
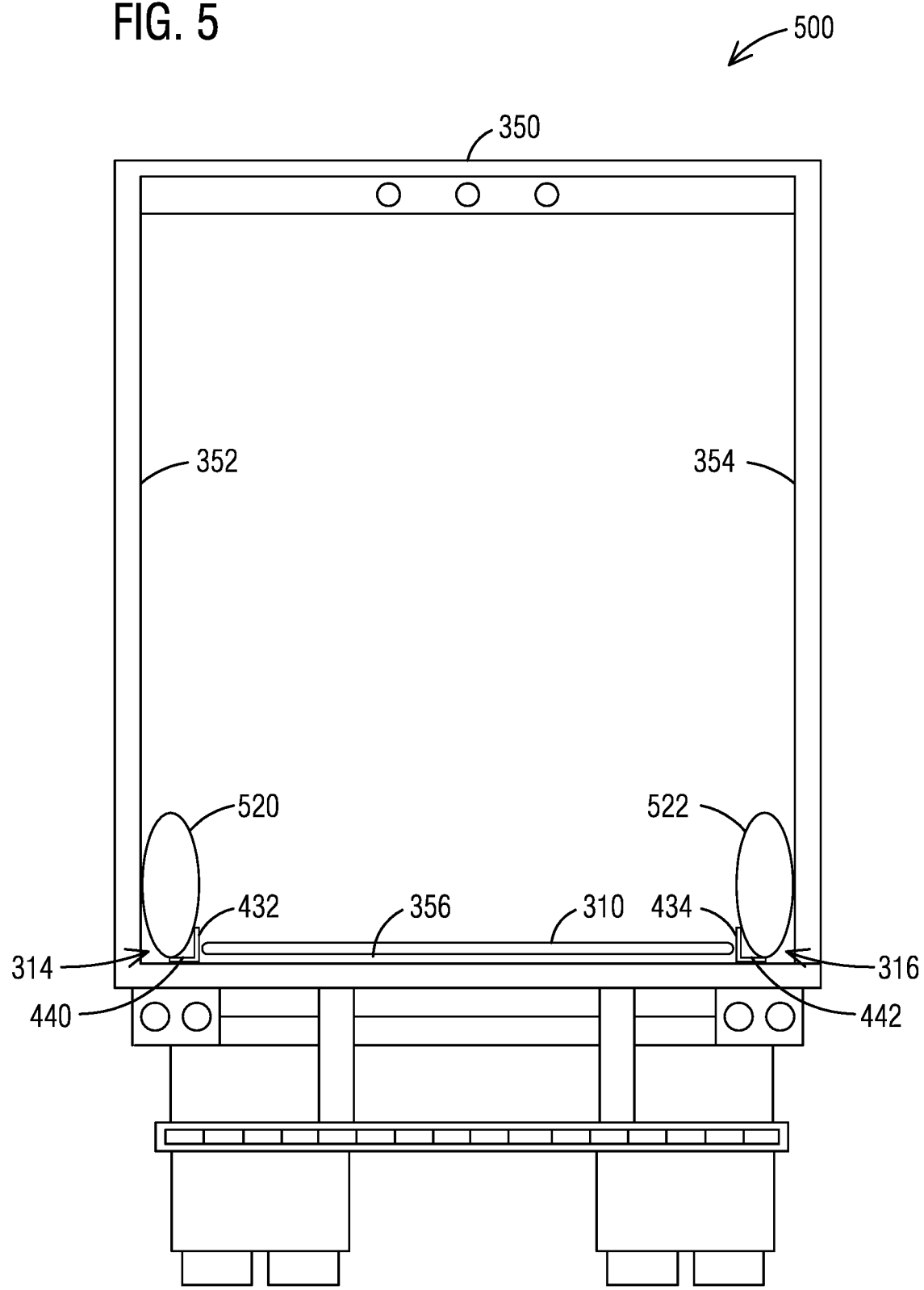
FIG. 5 depicts a portion of a system for automatic unloading of parcels in accordance with a further exemplary embodiment of the present disclosure.

FIG. 5 depicts a portion of a system for automatic unloading of parcels in accordance with an exemplary embodiment of the present disclosure. The embodiment shown in FIG. 5 provides another option for a belt kit, specifically belt kit 500, to be used in combination with unloading apparatus 200.

The exemplary embodiment in accordance with FIG. 5 comprises first and second inserts 520, 522 comprising inflatable devices with a predefined shape configured to be arranged in first and second lower corners 314, 316 of the interior of the container or trailer 350. The inflatable devices are secured to the interior of the trailer 350. The inflatable devices comprise fabric and/or plastic material. The belt kit 500 also comprises base belt 310.

The inflatable can be formed or shaped such that they provide or form a funnel when installed in the trailer 350. This way, the inflatable devices may cause some of the items 370 to fall onto the base belt 310 and/or the conveyor 226 of the unloading apparatus 220 during an unloading process.

In addition to the inflatable devices, the inserts 520, 522 comprise L-shaped profiles 440, 442 secured to the floor 356. The L-shaped profiles 440, 442 may be utilized to hold the inflatable devices in place, i.e. the inflatable devices may be located between the sidewalls 352, 354 and the L-shaped profiles 440, 442. Further, the L-shaped profiles 440, 442 provide surfaces 432, 434 for guiding the automatic unloading apparatus 200 when entering the trailer 350. The surfaces 432, 434 are vertically arranged on the floor 356, i.e. they are perpendicular to the floor 356. In an example, the unloading apparatus 200 may comprise guide wheels mounted on either side of the ramp 230, wherein the guide wheels can run along the vertical surfaces 432, 434. This way, the unloading apparatus 200 is centred and there is no need for a further steering mechanism of the apparatus 200.

The invention claimed is:

1. A system for automatic unloading of parcels from a container or trailer comprising:
   a base belt configured to be installed in a container or trailer and to carry a plurality of items,
   a plurality of inserts configured to be attached to interior walls of the container or trailer, and
   an automated unloading apparatus comprising a ramp and a conveyor and configured to move into an interior of the container or trailer,
   wherein the ramp is configured to pass under the base belt and the conveyor is configured to remove the plurality of items when the automated unloading apparatus moves into the interior of the container or trailer,
   wherein the base belt is configured to be installed in a first section of a floor of the container or trailer and the plurality of inserts is configured to be installed in a second section of the floor of the container or trailer, such that the plurality of items is either located on the base belt or on the plurality of inserts, and
   wherein the plurality of inserts comprises:
   a first insert configured to be attached to a first interior sidewall of the container or trailer,
   a second insert configured to be attached to a second interior sidewall opposite the first interior sidewall of the container or trailer,
   wherein the first and second inserts are configured to run an entire length of the first and second interior sidewalls, and
   wherein the first and second inserts comprise inflatable devices with a predefined shape configured to be arranged in first and second lower corners of the interior of the container or trailer.

2. The system of claim 1, wherein the plurality of inserts, when installed in the second section of the floor, prevent the plurality of items to fall off the base belt on the floor of the trailer.

3. The system of claim 1, wherein the plurality of inserts, when installed in the second section of the floor, cause some items of the plurality of items to fall onto the base belt or conveyor during an unloading process.

4. The system of claim 1, further comprising:
   an operator console and a controller communicatively coupled to the operator console, wherein the automated unloading apparatus is communicatively coupled to the controller in an unloading process.

5. A system for automatic unloading of parcels from a container or trailer comprising:
   a base belt configured to be installed in a container or trailer and to carry a plurality of items,
   a plurality of inserts configured to be attached to interior walls of the container or trailer, and
   an automated unloading apparatus comprising a ramp and a conveyor and configured to move into an interior of the container or trailer,
   wherein the ramp is configured to pass under the base belt and the conveyor is configured to remove the plurality of items when the automated unloading apparatus moves into the interior of the container or trailer,
   wherein the base belt is configured to be installed in a first section of a floor of the container or trailer and the plurality of inserts is configured to be installed in a second section of the floor of the container or trailer, such that the plurality of items is either located on the base belt or on the plurality of inserts, and
   wherein the automatic unloading apparatus further comprises guide wheels mounted on either side of the ramp, and wherein the plurality of inserts, when installed in the second section of the floor, provide surfaces for the guide wheels of the automatic unloading apparatus.

6. The system of claim 5, wherein the plurality of inserts, when installed in the second section of the floor, prevent the plurality of items to fall off the base belt on the floor of the trailer.

7. The system of claim 5, wherein the plurality of inserts, when installed in the second section of the floor, cause some items of the plurality of items to fall onto the base belt or conveyor during an unloading process.

8. The system of claim 5, further comprising:
   an operator console and a controller communicatively coupled to the operator console, wherein the automated unloading apparatus is communicatively coupled to the controller in an unloading process.

9. A belt kit for use with a system for automatic unloading of parcels from a container or trailer comprising:
   a base belt configured to be installed in a container or trailer and to carry a plurality of items, and
   a plurality of inserts configured to be attached to interior walls of the container or trailer,
   wherein the base belt is configured to be installed in a first section of a floor of the container or trailer and the plurality of inserts are configured to be installed in a second section of the floor of the container or trailer, such that the plurality of items is either located on the base belt or on the plurality of inserts, and
   wherein the first and second inserts comprise inflatable devices with a predefined shape configured to be arranged in first and second lower corners of an interior of the container or trailer.

10. The belt kit of claim 9, wherein the plurality of inserts comprises:
    a first insert configured to be attached to a first interior wall of the container or trailer,
    a second insert configured to be attached to a second interior wall opposite the first interior wall of the container or trailer,
    wherein the first and second inserts are configured to run an entire length of the first and second interior walls.

11. The belt kit of claim 9, configured to be used with an automated unloading apparatus comprising a ramp and a conveyor and configured to move into the interior of the container or trailer, and wherein the ramp is configured to pass under the base belt and the conveyor is configured to remove the plurality of items when the automated unloading apparatus moves into the interior of the container or trailer.

12. The belt kit of claim 9, wherein the plurality of inserts, when installed in the second section of the floor, cause some items of the plurality of items to fall onto the base belt or conveyor during an unloading process.

\* \* \* \* \*